(12) United States Patent
Shinya (10) Patent No.: US 8,713,402 B2
(45) Date of Patent: Apr. 29, 2014

(54) OPTICAL CHANNEL TRANSPORT UNIT FRAMES TRANSMISSION HAVING INTERLEAVED PARITY

(75) Inventor: Kazunori Shinya, Tokyo (JP)

(73) Assignee: NEC Corporation, Tokyo (JP)

( * ) Notice: Subject to any disclaimer, the term of this patent is extended or adjusted under 35 U.S.C. 154(b) by 322 days.

(21) Appl. No.: 13/197,186

(22) Filed: Aug. 3, 2011

(65) Prior Publication Data

US 2012/0047419 A1 Feb. 23, 2012

(30) Foreign Application Priority Data

Aug. 23, 2010 (JP) ................................. 2010-185806

(51) Int. Cl.
*H03M 13/00* (2006.01)

(52) U.S. Cl.
USPC ............. 714/758; 714/776; 714/801; 398/27; 398/43

(58) Field of Classification Search
USPC ................. 714/758, 776, 801; 398/27, 43
See application file for complete search history.

(56) References Cited

U.S. PATENT DOCUMENTS

| 7,036,070 | B1 * | 4/2006 | Ozdemir ........................ 714/801 |
| 7,769,051 | B2 * | 8/2010 | Perkins et al. ................ 370/481 |
| 7,936,881 | B2 * | 5/2011 | Mayer ............................ 380/277 |
| 7,957,642 | B2 * | 6/2011 | Loprieno ........................ 398/27 |
| 8,213,446 | B2 * | 7/2012 | Meagher et al. .............. 370/419 |

FOREIGN PATENT DOCUMENTS

| JP | 2933479 B | 8/1999 |
| JP | 2003188919 A | 7/2003 |

* cited by examiner

*Primary Examiner* — Esaw Abraham
(74) *Attorney, Agent, or Firm* — Sughrue Mion, PLLC (57) ABSTRACT

A transmission system carrying out sending and receiving of OTU frames has a first transmission device carrying out the sending of an OTU frame, and a second transmission device carrying out the receiving of the OTU frame. The first transmission device calculates BIP-8 for an objective calculation range preset in the OTU frame, inserts the calculation result into the OTU frame, and sends the same. The second transmission device calculates BIP-8 from the received OTU frame for the same objective calculation range as the first transmission device, compares the calculation result with the BIP-8 sent from the first transmission device, and detects any presence of transmission error. The calculation range is set in terms of one of an area including OPU only and an area at least including an arbitrary byte of OTU/ODU overhead.

9 Claims, 11 Drawing Sheets

EXAMPLE OF SETTING CALCULATION RANGE

| SETTING NUMBER | CALCULATION RANGE |
|---|---|
| 1 | PAYLOAD AREA (STANDARD MODE) |
| 2 | PAYLOAD AREA + ARBITRARY OH AREA |
| 3 | ARBITRARY OH AREA ONLY (PAYLOAD NOT INCLUDED) |

OH DEFINITION OF OTUk/ODUk OF OTN SIGNAL

| Row\Column | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | FAS | | | | | | MFAS | SM | | | GCC0 | | RES | | OPUk OH | |
| 2 | RES | | | TCM ACT | TCM2 | TCM6 | | TCM5 | | | TCM4 | | FTFL | | | |
| 3 | TCM3 | | | | | | | TCM1 | | | PM | | EXP | | | |
| 4 | GCC1 | | GCC2 | | APS/PCC | | | | | | RES | | | | | |

BYTE AREA DEFINITION OF SM/PM/TCMS 1 TO 6 WITHIN OTUk/ODUk OH

| 1 | 2 | 3 |
|---|---|---|
| TTI | BIP-8 | |

FIG. 11

OPTICAL CHANNEL TRANSPORT UNIT FRAMES TRANSMISSION HAVING INTERLEAVED PARITY

INCORPORATION BY REFERENCE

The present application claims priority from Japanese Patent Application No. 2010-185806, filed on Aug. 23, 2010 in Japan, the disclosure of which is incorporated herein by reference in its entirety.

TECHNICAL FIELD

The present invention relates to communication networks configured by transmission devices carrying out the sending and receiving of optical transmission unit frames.

BACKGROUND ART

As a communication network carrying out the sending and receiving of optical transmission unit frames, there is Optical Transport Network (OTN) specified in G. 709 of the ITU-T Recommendation. The frame of this OTN network has a hierarchical structure as will be described hereinbelow. First, a client signal (SDH, Ethernet™, and the like) with added OPU overhead (OH) is called an Optical-channel Payload Unit (OPU). The definition of each byte of the OPU overhead varies with the client signal which is an OPU payload. Next, This OPU with added ODU overhead is called an Optical Data Unit (ODU). Then, this ODU with added OTU overhead and Forward Error Collection (FEC) becomes an Optical Channel Transport Unit (OTU) frame. Further, when k is added such as OTUk and ODUk, they refer to the number k or the kth OTU and ODU.

The OTU frame is composed of 4080 bytes in four rows. The bytes of each row are specified by the number of columns 1 to 4080. The OTU/ODU overhead is positioned in the columns 1 to 14. The OPU overhead is positioned in the columns 15 and 16. The OPU payload is positioned in the columns 17 to 3824. The FEC is positioned in the columns 3825 to 4080.

Figure 10:
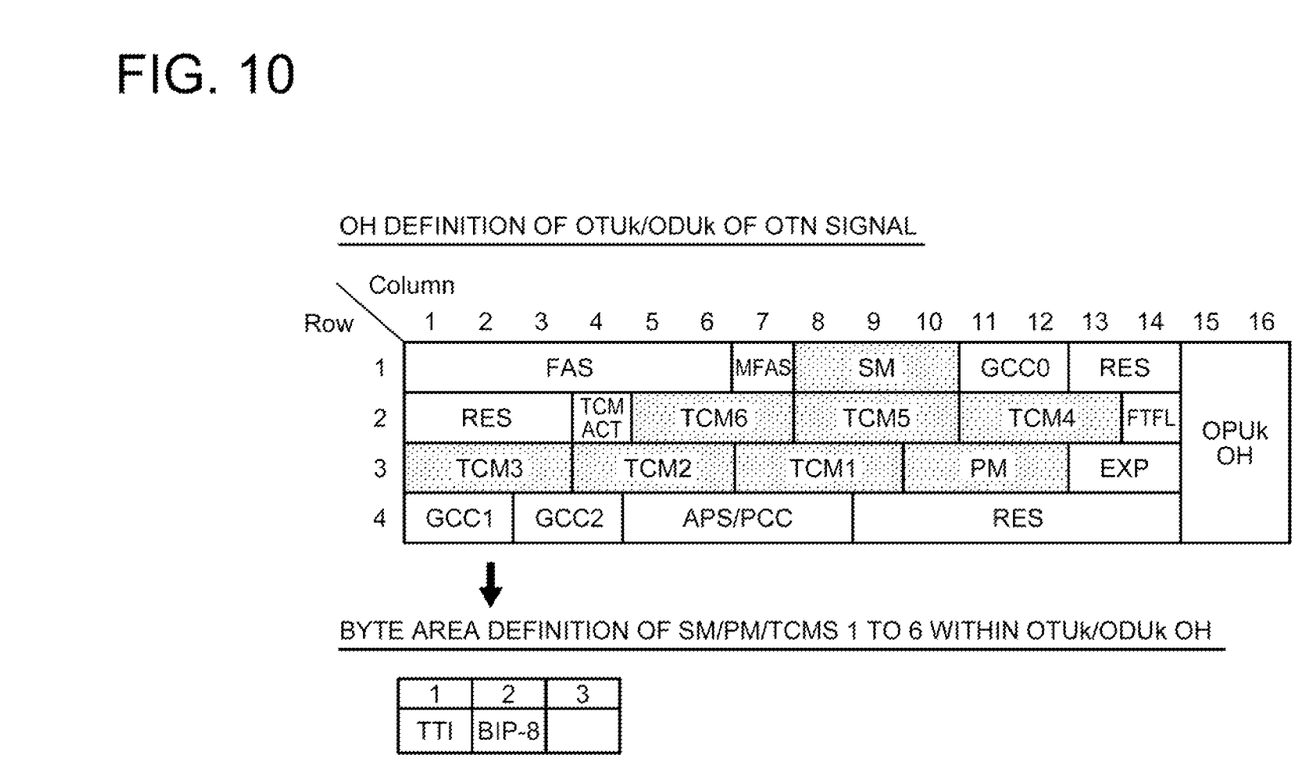
FIG. 10 is an explanatory diagram for a definition of OTU/ODU overhead.

FIG. 10 shows a definition of the OTU/ODU overhead. Each symbol in the diagram has the following meaning. FAS indicates a frame alignment signal. MFAS indicates a multi-frame alignment signal. SM indicates section monitoring. GCC0 to GCC3 indicate general-purpose communication channels. RES indicates a reserved state. TCMACT indicates tandem connection monitoring activation. TCM1 to TCM6 indicate tandem connection monitoring. FTFL indicates failure type and failure location. PM indicates path monitoring. EXP indicates experimental usage. APS/PCC indicates automatic protection switching/protection communication channel. The bytes disposed in the columns 8 to 14 of the row 1 constitute the OTU overhead. The bytes disposed in the columns 1 to 14 of the rows 2 to 4 constitute the ODU overhead.

The OTU overhead provides various monitoring functions. As one of them, it is the function for detecting transmission error of OTU frames and, for this function, BIP-8 is defined in the second byte of SM. In the same manner, as one function of the ODU overhead, there is a function for detecting transmission error of ODU and, for this function, BIP-8 is defined in the second byte of PM and TCM1 to TCM6.

Figure 11:
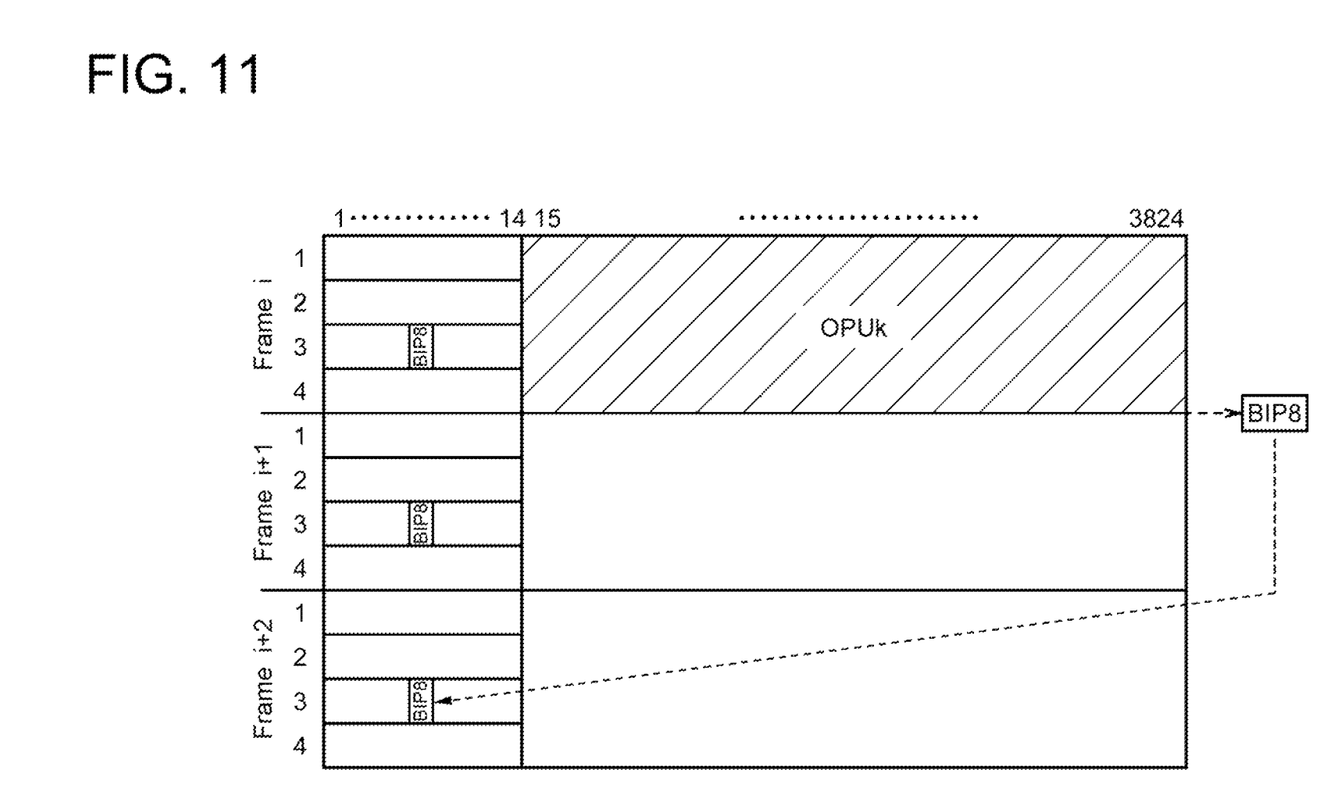
FIG. 11 is an explanatory diagram for the calculation range of BIP-8 according to G. 709 of the ITU-T Recommendation.

BIP-8 is the abbreviation of bit interleaved parity of 8 bits. BIP-8 calculates the parity eight times in such a manner as for the first bit, the second bit and the like of each byte included in a calculation range. In G. 709 of the ITU-T Recommendation, as shown in FIG. 11, the portion of OPU data (the area combining the OPU payload and the OPU overhead: the columns 15 to 3824 in the rows 1 to 4) is taken as the calculation range. Further, the value of BIP-8 calculated for the frame i is inserted into a predetermined place in the frame i+2 which is the second succeeding frame after the frame i (the second byte of SM for the OTU overhead; the second byte of PM and TCM1 to TCM6 for the ODU overhead).

The following patent document 1 discloses a transmission system carrying out error monitoring by the BIP-8 calculation as described hereinabove. Further, the following patent document 2 discloses an optical transmission network.

[Patent Document 1] JP 2933479
[Patent Document 2] JP 2003-188919 A

As described hereinabove, in G. 709 of the ITU-T Recommendation, the portion of OPU data (also to be described as payload information hereinbelow at times) is taken as the calculation range of BIP-8. Therefore, even though transmission error occurs in the portion of the OTU/ODU overhead, it cannot be detected by BIP-8.

SUMMARY

In view of the above, an exemplary object of the present invention is to provide a transmission system for solving the above problem, that is, transmission error of the OTU/ODU overhead cannot be detected by BIP-8.

An aspect in accordance with the present invention provides a transmission system including a plurality of transmission devices carrying out sending and receiving of OTU frames, the transmission system including: a first transmission device carrying out the sending of an OTU frame; and a second transmission device carrying out the receiving of the OTU frame sent from the first transmission device, wherein the first transmission device includes a first storage portion for storing first calculation range information indicating either one of a first area including OPU only and a second area at least including an arbitrary byte of OTU/ODU overhead as an area for calculating a bit interleaved parity of 8 bits, a first calculation portion for calculating the bit interleaved parity of 8 bits for an objective area determined by the first calculation range information among areas of the sending OTU frame, and an insertion portion for inserting a calculation result of the bit interleaved parity of 8 bits from the first calculation portion into the sending OTU frame; and wherein the second transmission device includes an extraction portion for extracting the bit interleaved parity of 8 bits from the received OTU frame, a second storage portion for storing second calculation range information indicating the same calculation range as the first calculation range information as an area for calculating a bit interleaved parity of 8 bits, a second calculation portion for calculating the bit interleaved parity of 8 bits for an objective area determined by the second calculation range information among areas of the received OTU frame, and an error detection portion for detecting error by comparing a calculation result of the bit interleaved parity of 8 bits from the second calculation portion with the bit interleaved parity of 8 bits extracted by the extraction portion.

Another aspect in accordance with the present invention provides a failure monitoring method to be performed by a transmission system composed of a plurality of transmission devices including: a first transmission device which has a first storage portion for storing first calculation range information indicating either one of a first area including OPU only and a second area at least including an arbitrary byte of OTU/ODU overhead as an area for calculating a bit interleaved parity of 8 bits, a first calculation portion, and an insertion portion; and a second transmission device which has a second storage portion for storing second calculation range information indicating the same calculation range as the first calculation range information as an area for calculating a bit interleaved parity of 8 bits, an extraction portion, a second calculation portion, and an error detection portion, the failure monitoring method including: calculating the bit interleaved parity of 8 bits for an objective area determined by the first calculation range information among areas of the sending OTU frame by virtue of the first calculation portion of the first transmission device; inserting the calculation result of the bit interleaved parity of 8 bits from the first calculation portion into the second succeeding OTU frame and sending the same by virtue of the insertion portion of the first transmission device; extracting the bit interleaved parity of 8 bits from the received OTU frame by virtue of the extraction portion of the second transmission device; calculating the bit interleaved parity of 8 bits for an objective area determined by the second calculation range information among areas of the received OTU frame by virtue of the second calculation portion of the second transmission device; and detecting error by comparing the calculation result of the bit interleaved parity of 8 bits from the second calculation portion with the hit interleaved parity of 8 bits extracted by the extraction portion from the second succeeding OTU frame after the OTU frame for which the calculation result has been obtained by virtue of the error detection portion of the second transmission device.

Still another aspect in accordance with the present invention provides a transmission device carrying out sending and receiving of OTU frames, the transmission device including: a sending portion; and a receiving portion, wherein the sending portion includes a first storage portion for storing first calculation range information indicating either one of a first area including OPU only and a second area at least including an arbitrary byte of OTU/ODU overhead as an area for calculating a bit interleaved parity of 8 bits, a first calculation portion for calculating the bit interleaved parity of 8 bits for an objective area determined by the first calculation range information among areas of a sending OTU frame, and an insertion portion for inserting a calculation result of the bit interleaved parity of 8 bits from the first calculation portion into the sending OTU frame; and wherein the receiving portion includes an extraction portion for extracting the bit interleaved parity of 8 bits from the received OTU frame, a second storage portion for storing second calculation range information indicating either one of a first area including OPU only and a second area at least including an arbitrary byte of OTU/ODU overhead as an area for calculating a bit interleaved parity of 8 bits, a second calculation portion for calculating the bit interleaved parity of 8 bits for an objective area determined by the second calculation range information among areas of the received OTU frame, and an error detection portion for detecting error by comparing a calculation result of the bit interleaved parity of 8 bits from the second calculation portion with the bit interleaved parity of 8 bits extracted by the extraction portion.

Because the present invention has the configuration described hereinabove, it is possible to detect transmission error of the OTU/ODU overhead by BIP-8.

EXEMPLARY EMBODIMENTS

Next, referring to the accompanying drawings, descriptions will be made in detail with respect to exemplary embodiments of the present invention.

A First Exemplary Embodiment

Figure 1:
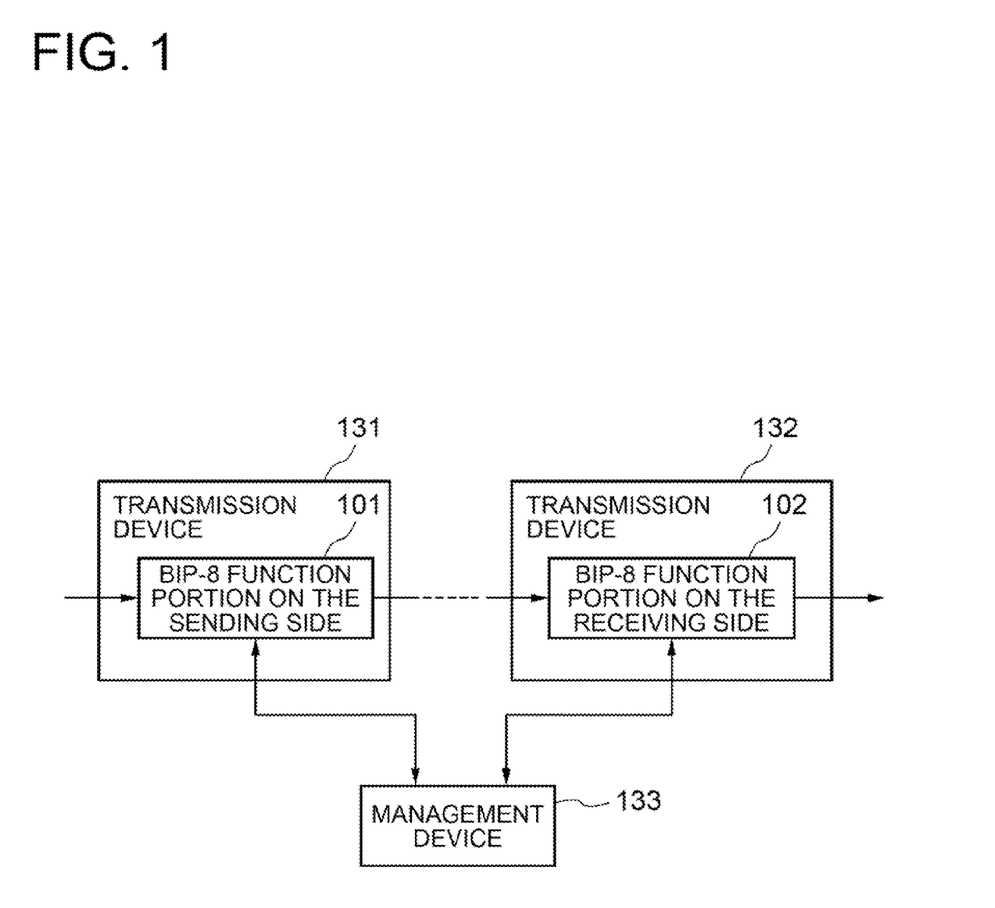
FIG. 1 is a block diagram of a transmission system in accordance with a first exemplary embodiment of the present invention.

Referring to FIG. 1, a transmission system in accordance with a first embodiment of the present invention is composed of a plurality of transmission devices 131 and 132 for carrying out the sending and receiving of OTU frames, and a management device 133 for managing the plurality of transmission devices. Although FIG. 1 shows two transmission devices only, there may be more than two transmission devices.

The transmission device 131 serves to send OTU frames to the transmission device 132. The transmission device 131 includes a BIP-8 function portion on the sending side 101 for detecting by BIP-8 the transmission error occurring in the transmission section from the transmission device 131 per se to the transmission device 132.

The transmission device 132 serves to receive OTU frames sent from the transmission device 131. The transmission device 132 includes a BIP-8 function portion on the receiving side 102 for detecting by BIP-8 the transmission error occurring in the transmission section from the transmission device 131 to the transmission device 132 per se.

Figure 2:
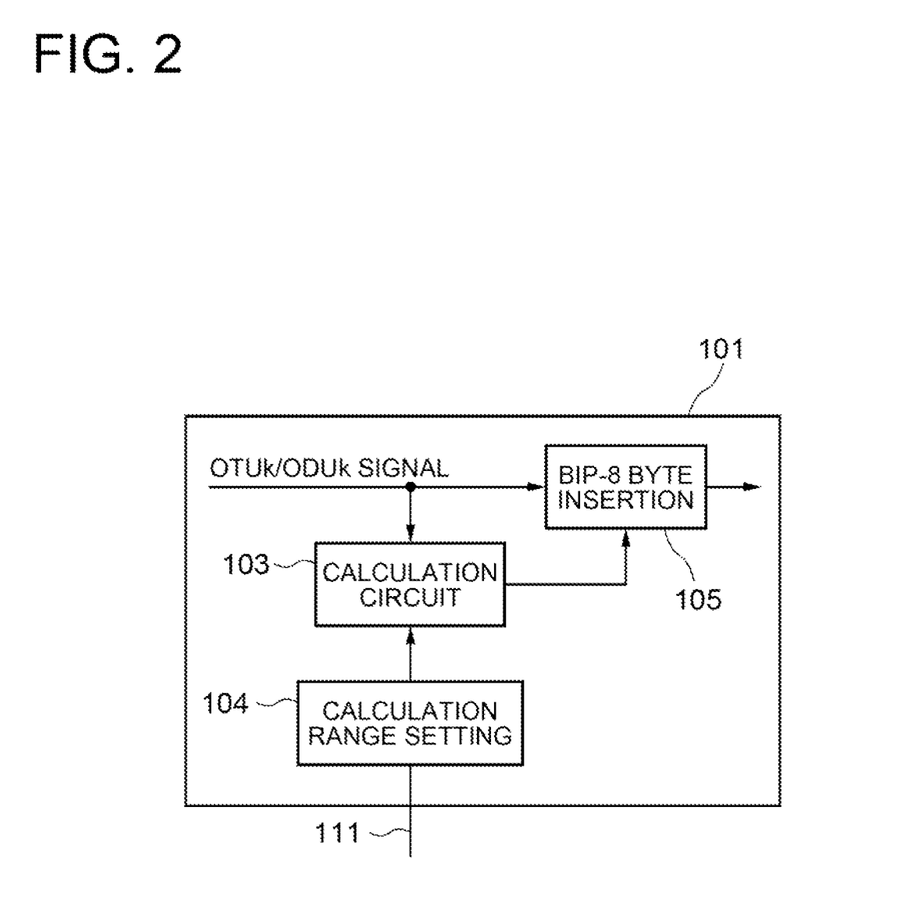
FIG. 2 is a block diagram of a BIP-8 function portion on the sending side provided in a transmission device constituting the transmission system in accordance with the first exemplary embodiment of the present invention.

Referring to FIG. 2, the BIP-8 function portion on the sending side 101 is composed of a calculation circuit 103, a calculation range setting portion 104, and a BIP-8 byte insertion portion 105.

The calculation range setting portion 104 is a memory or register for storing information indicating the area of calculating BIP-8. The management device 133 sets (stores) either the calculation range specified by G. 709 of the ITU-T Recommendation (to be referred to as the standard calculation range hereinafter), or the calculation range at least including an arbitrary byte of OTU/ODU overhead (to be referred to as the nonstandard calculation range hereinafter), into the calculation range setting portion 104 through an interface 111.

The calculation circuit 103 has a function for calculating BIP-8 for the objective bytes included in the calculation range set into the calculation range setting portion 104 among the bytes of the OTU/ODU signal of a sending frame.

The BIP-8 byte insertion portion 105 has a function for inserting the calculation result of BIP-8 calculated by the calculation circuit 103 for a certain frame into the OTU/ODU overhead of the second succeeding frame: More particularly, in the case of error monitoring for the OTU layer, the BIP-8 byte insertion portion 105 inserts the calculation result of BIP-8 into the second byte of SM. Further, in the case of error monitoring for the ODU layer, the BIP-8 byte insertion portion 105 inserts the calculation result of BIP-8 into the second byte of either PM or TCM1 to TCM6.

Figure 3:
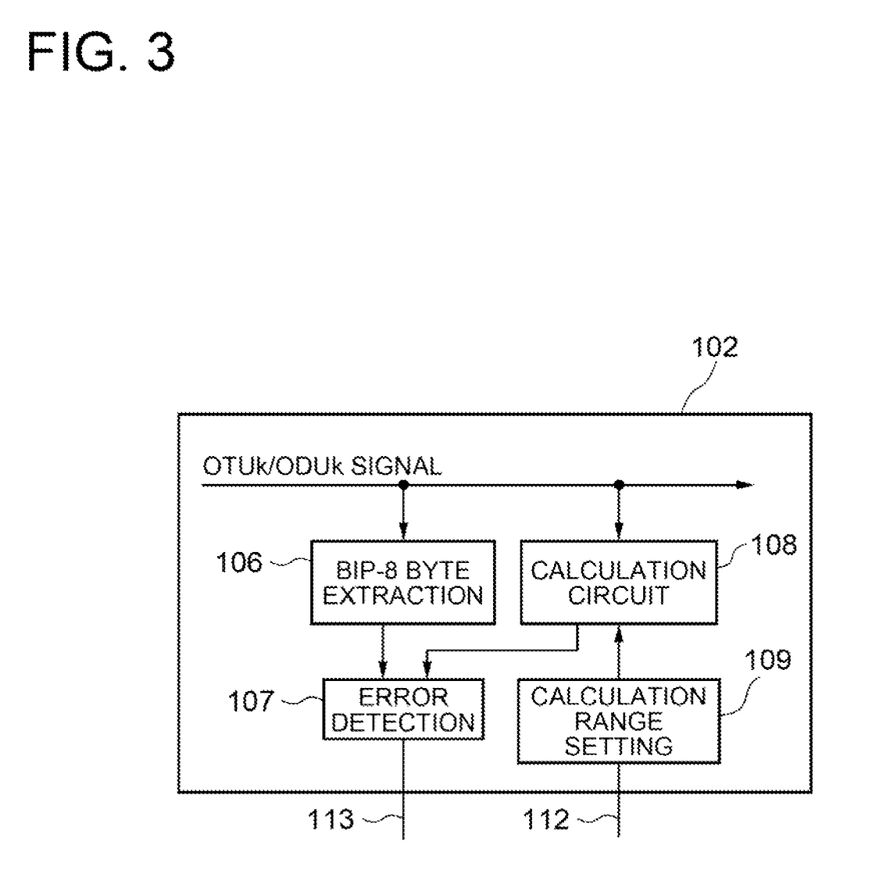
FIG. 3 is a block diagram of a BIP-8 function portion on the receiving side provided in another transmission device constituting the transmission system in accordance with the first exemplary embodiment of the present invention.

Referring to FIG. 3, the BIP-8 function portion on the receiving side 102 is composed of a BIP-8 byte extraction portion 106, an error detection portion 107, a calculation circuit 108, and a calculation range setting portion 109.

The calculation range setting portion 109 is a memory or register for storing information indicating the area of calculating BIP-8. The management device 133 sets (stores) either the standard calculation range or the nonstandard calculation range into the calculation range setting portion 109 through an interface 112.

The BIP-8 byte extraction portion 106 has a function for extracting BIP-8 from the OTU/ODU overhead of the received frame. More particularly, in the case of error monitoring for the OTU layer, the BIP-8 byte extraction portion 106 extracts BIP-8 from the second byte of SM. Further, in the case of error monitoring for the ODU layer, the BIP-8 byte extraction portion 106 extracts BIP-8 from the second byte of either PM or TCM1 to TCM6.

The calculation circuit 108 has a function for calculating BIP-8 for the objective bytes included in the calculation range set into the calculation range setting portion 109 among the bytes of the OTU/ODU signal of a received frame.

The error detection portion 107 has a function for detecting error by comparing the BIP-8 calculated by the calculation circuit 108 with the BIP-8 extracted by the BIP-8 byte extraction portion 106 from the second succeeding frame after the frame for which the calculation result has been obtained. Further, the error detection portion 107 has a function for outputting the detection result to the management device 133 through an interface 113.

Figure 4:
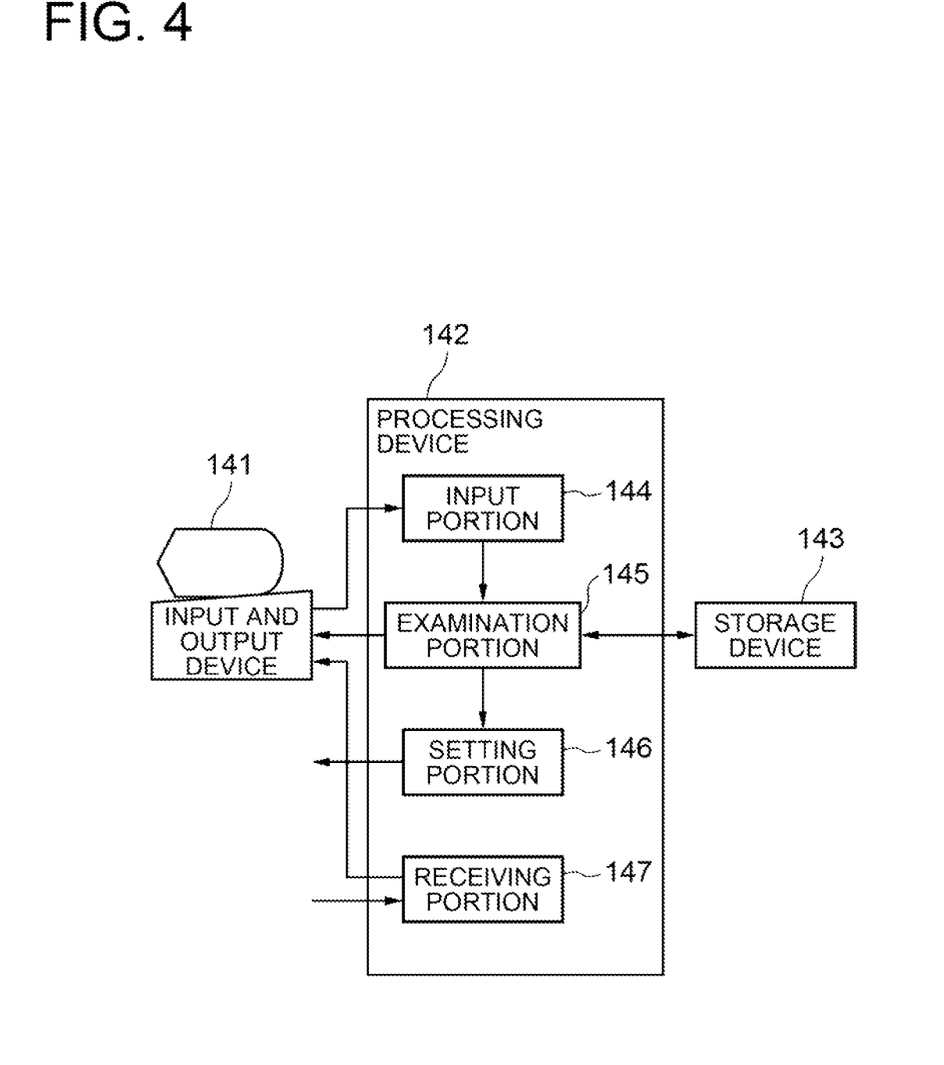
FIG. 4 is a block diagram of a management device constituting the transmission system in accordance with the first exemplary embodiment of the present invention.

Referring to FIG. 4, the management device 133 is composed of an input and output device 141 composed of an input device such as a keyboard and the like, and an output device such as a display and the like, a processing device 142 such as a CPU and the like, and a storage device 143 such as magnetic disks and the like. Further, the processing device 142 has an input portion 144 realized by computer programs and the like, an examination portion 145, a setting portion 146; and a receiving portion 147.

The input portion 144 inputs a group of a monitoring section and the calculation range information corresponding to that monitoring section from the input and output device 141, and transmits the same to the examination portion 145. A monitoring section refers to a section from a transmission device which is the generation point of BIP-8 to another transmission device which is the examination point for examining the BIP-8 generated by the first transmission device among the plurality of transmission devices through which the OTU frame passes. Further, calculation range information refers to the information indicating the area for calculating BIP-8. The calculation range information is either the standard calculation range or the nonstandard calculation range.

The storage device 143 stores groups of a monitoring section and the calculation range information corresponding to that monitoring section already set in the plurality of transmission devices as the management objects taken by the management device 133.

The examination portion 145 has a function for examining if any problems will arise in the case of setting the group of a monitoring section and the calculation range information corresponding to that monitoring section inputted from the input portion 144 in concurrence with other already-set monitoring sections and calculation ranges.

More particularly, the examination portion 145 first determines whether the calculation range information of the group inputted from the input portion is the standard calculation range or the nonstandard calculation range. If it is the standard calculation range, the examination portion 145 determines it to be settable in concurrence with other already-set monitoring sections, and transmits the information of the inputted group to the setting portion 146. Next, if it is the nonstandard calculation range, the examination portion 145 examines if there are groups with the nonstandard calculation range among those stored in the storage device 143. If there is none, it determines the presently inputted group to be settable, and transmits the information of the inputted group to the setting portion 146. On the other hand, if there is at least one group with the nonstandard calculation range, the examination portion 145 compares the presently inputted group with each of those groups to examine whether or not they are overlapped both on the monitoring section and on the calculation range of OTU/ODU overhead. Then, if there is not any already-set group overlapping the presently inputted group both on the monitoring section and on the calculation range of OTU/ODU overhead, it determines the presently inputted group to be settable, and transmits the information of the inputted group to the setting portion 146.

On the other hand, even if there is only one already-set group overlapping the presently inputted group both on the monitoring section and on the calculation range of OTU/ODU overhead, the examination portion 145 determines the presently inputted group to be not settable, and does not transmit it to the setting portion 146 but outputs an alarm to the input and output device 141.

The setting portion 146 has a function for setting the calculation range information for a transmission device which is the generation point of parity and another transmission device which is the examination point for examining the parity generated by the first transmission device, according to the information of the group inputted by the input portion 144 and determined to be settable by the examination portion 145.

The receiving portion 147 has a function for receiving the error detection information based on BIP-8 sent from each transmission device, and outputting the same to the input and output device 141.

Next, descriptions will be made with respect to the error monitoring operation based on BIP-8 in the transmission system in accordance with the first exemplary embodiment. For the convenience of explanation, the transmission device 131 in FIG. 1 is regarded as the sending side of error monitoring, and the transmission device 132 is regarded as the receiving side of error monitoring.

The operator inputs a group of a monitoring section and the calculation range information from the input and output device 141 of the management device 133. The information of the input monitoring section designates the identifier of the transmission device 131 to specify that the transmission device 131 is the sending side of error monitoring. Further, the information of the input monitoring section designates the identifier of the transmission device 132 to specify that the transmission device 132 is the receiving side of error monitoring. Further, the information of the input monitoring section designates on which of the OTU layer and the ODU layer the error monitoring is carried out and, if carried out on the ODU layer, it designates which of PM and TCM1 to TCM6 is utilized as the byte of overhead. Further, the information of the input monitoring section designates the calculation range.

Figure 5:
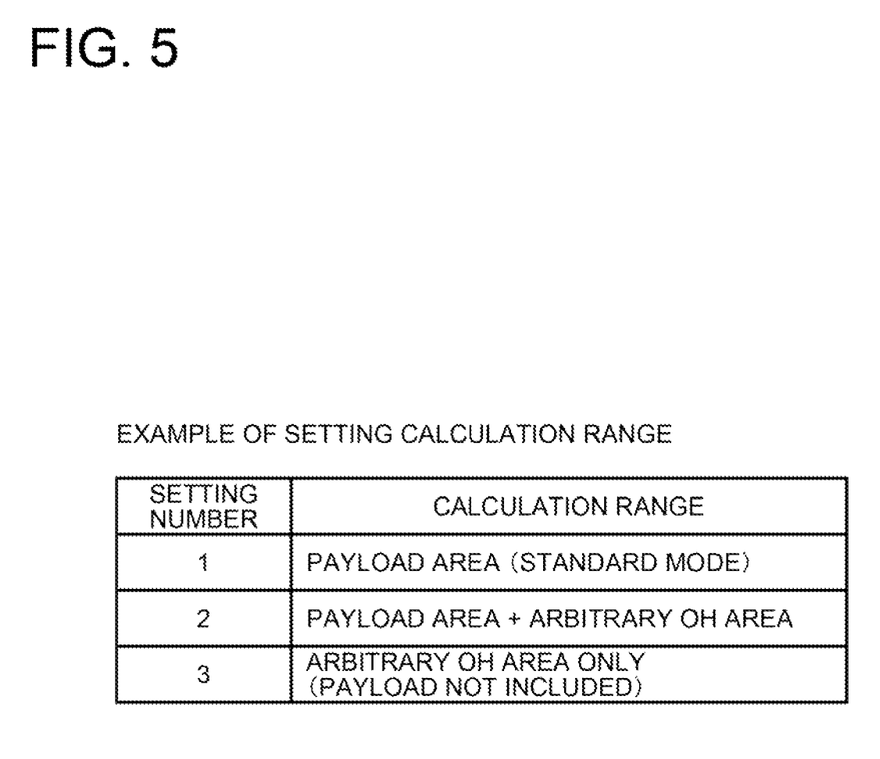
FIG. 5 is a diagram showing an example of calculation range set to the BIP-8 function portion on the sending side and the BIP-8 function portion on the receiving side provided in the transmission devices constituting the transmission system in accordance with the first exemplary embodiment of the present invention.

As a way to designate the calculation range, such a method may be utilized that the designation is carried out by predefining the relationship between the setting number and the calculation range on the system as the example of setting the calculation range shown in FIG. 5, and then letting the operator designate the setting number. In the example of FIG. 5, it is possible to designate three types of calculation ranges. The setting number 1 corresponds to the standard calculation range. The setting numbers 2 and 3 correspond to nonstandard calculation ranges different to each other. In particular, the setting number 2 designates a predetermined area of OTU/ODU overhead in addition to the standard calculation range as the calculation range. Further, the setting number 3 excludes the standard calculation range and designates a predetermined area of OTU/ODU overhead only as the calculation range. As an example of the predetermined area for the setting numbers 2 and 3, GCC1 may serve the purpose. As another example, GCC1 and GCC2 may also serve the purpose. Further, although the setting number is three in the above examples, it is not limited to three, but may as well be two or more than three.

As the input and output device 141 inputs a group of a monitoring section and the calculation range information, the input portion 144 of the management device 133 transmits the same to the examination portion 145. The examination portion 145 examines if any problems will arise in the case of setting the group of a monitoring section and the calculation range information corresponding to that monitoring section inputted from the input portion 144 in concurrence with other already-set monitoring sections and calculation ranges. If no problem may occur, the examination portion 145 stores the group of a monitoring section and the calculation range information corresponding to that monitoring section inputted from the input portion 144 into the storage device 143, and transmits the same to the setting portion 146. Based on the transmitted information, the setting portion 146 sets the calculation range information into the calculation range setting portion 104 in the BIP-8 function portion on the sending side 101 of the transmission device 131, and also sets the calculation range information into the calculation range setting portion 109 in the BIP-8 function portion on the receiving side 102 of the transmission device 132.

Thereafter, when the transmission device 131 sends an OTU frame to the transmission device 132, the following process is carried out in the BIP-8 function portion on the sending side 101. First, the calculation circuit 103 calculates BIP-8 for the objective byte included in the calculation range set into the calculation range setting portion 104 among the bytes of the OTU/ODU signal of the sending frame. Subsequently, the BIP-8 byte insertion portion 105 inserts the calculation result of BIP-8 calculated by the calculation circuit 103 into the OTU/ODU overhead of the second succeeding frame.

Further, the following process is carried out in the BIP-8 function portion on the receiving side 102 of the transmission device 132 having received the OTU frame sent from the transmission device 131. First, the BIP-8 byte extraction portion 106 extracts the BIP-8 from the OTU/ODU overhead of the received frame, and transmits the same to the error detection portion 107. Further, the calculation circuit 108 calculates BIP-8 for the objective byte included in the calculation range set into the calculation range setting portion 109 among the bytes of the OTU/ODU signal of the received frame, and transmits the calculation result to the error detection portion 107. The error detection portion 107 internally accumulates the BIP-8 calculated by the calculation circuit 108, and detects error by comparing the same with the BIP-8 extracted by the BIP-8 byte extraction portion 106 from the second succeeding frame. Then, if needed, the error detection portion 107 outputs the detection result to the management device 133 through the interface 113.

In the above manner, according to the first exemplary embodiment, by presetting the calculation range at least including an arbitrary byte of OTU/ODU overhead for the transmission device 131 on the sending side and the transmission device 132 on the receiving side in error monitoring, it is possible to detect transmission error of OTU/ODU overhead by BIP-8.

Further, according to the first exemplary embodiment, by presetting the standard calculation range for the transmission device 131 on the sending side and the transmission device 132 on the receiving side in error monitoring, it is possible to carry out error monitoring without obstacles based on the BIP-8 calculation exactly as specified in G. 709 of the ITU-T Recommendation.

Furthermore, according to the first exemplary embodiment, by including the examination portion 145 in the management device 133, it is possible to prevent the undesirable operation of concurrently setting a plurality of monitoring sections mutually overlapped both on the monitoring section and on the calculation range of OTU/ODU overhead. Thereby, it is possible to avoid possible malfunction of the transmission system due to improper operations along with the expansion of calculation range to OTU/ODU overhead.

A Second Exemplary Embodiment

Next, descriptions will be made with respect to a second exemplary embodiment of the transmission system in accordance with the present invention. A transmission system in accordance with the second exemplary embodiment utilizes a BIP-8 function portion on the sending side 201 shown in FIG. 6 instead of the BIP-8 function portion on the sending side 101, and utilizes a BIP-8 function portion on the receiving side 202 shown in FIG. 7 instead of the BIP-8 function portion on the receiving side 102.

Figure 6:
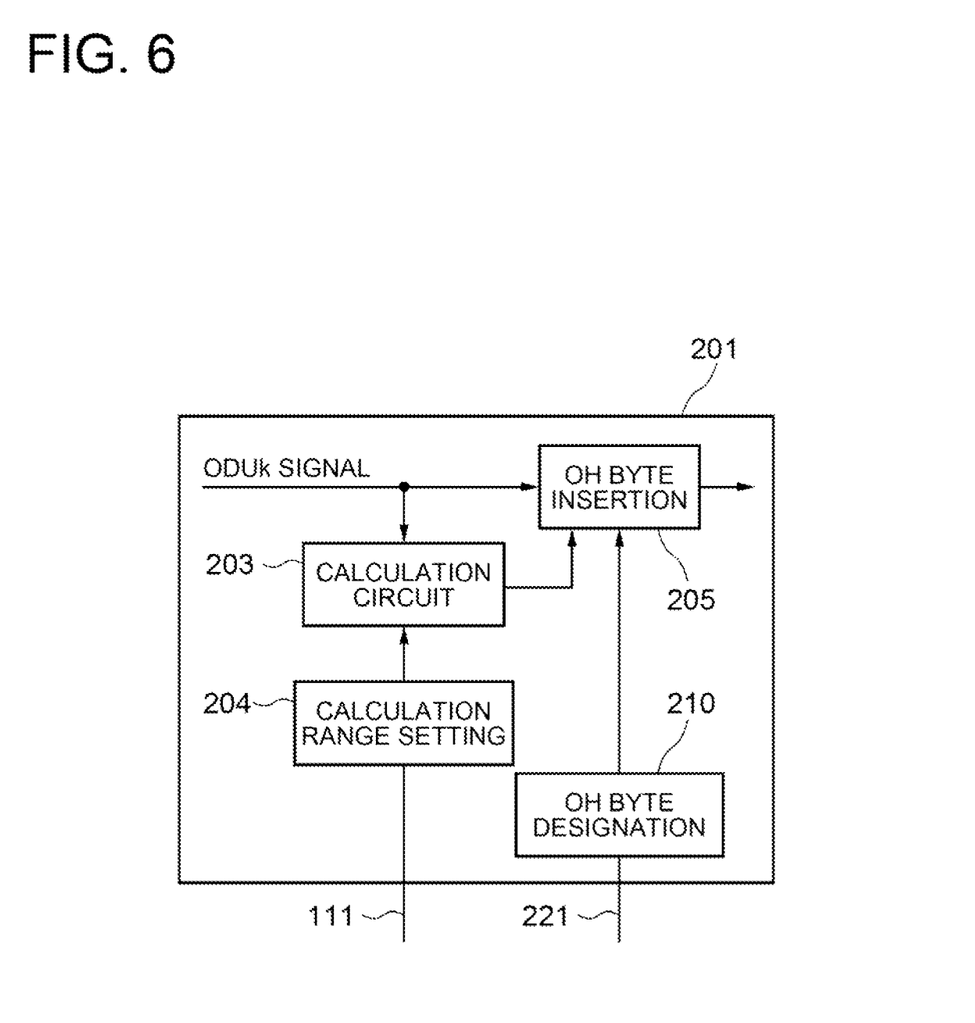
FIG. 6 is a block diagram of a BIP-8 function portion on the sending side provided in a transmission device constituting a transmission system in accordance with a second exemplary embodiment of the present invention.

Referring to FIG. 6, the BIP-8 function portion on the sending side 201 is composed of a calculation circuit 203, a calculation range setting portion 204, an OH byte insertion portion 205, and an OH byte designation portion 210. The Calculation circuit 203 and the calculation range setting portion 204 are the same as the calculation circuit 103 and the calculation range setting portion 104 of the BIP-8 function portion on the sending side 101.

The OH byte designation portion 210 designates the byte of the OTU/ODU overhead to insert the calculation result of the calculation circuit 203 for the OH byte insertion portion 205. In particular, the OH byte designation portion 210 designates any unutilized overhead byte such as undefined bytes of RES, bytes of EXP, bytes for which the standard utilization method of FTFL has not yet specified, and the like. To designate which byte is determined by the information bestowed from the management device 133 through an interface 221.

The OH byte insertion portion 205 has a function for inserting the calculation result of BIP-8 calculated by the calculation circuit 203 into the byte designated from the OH byte designation portion 210 on the OTU/ODU overhead of the second succeeding frame.

Figure 7:
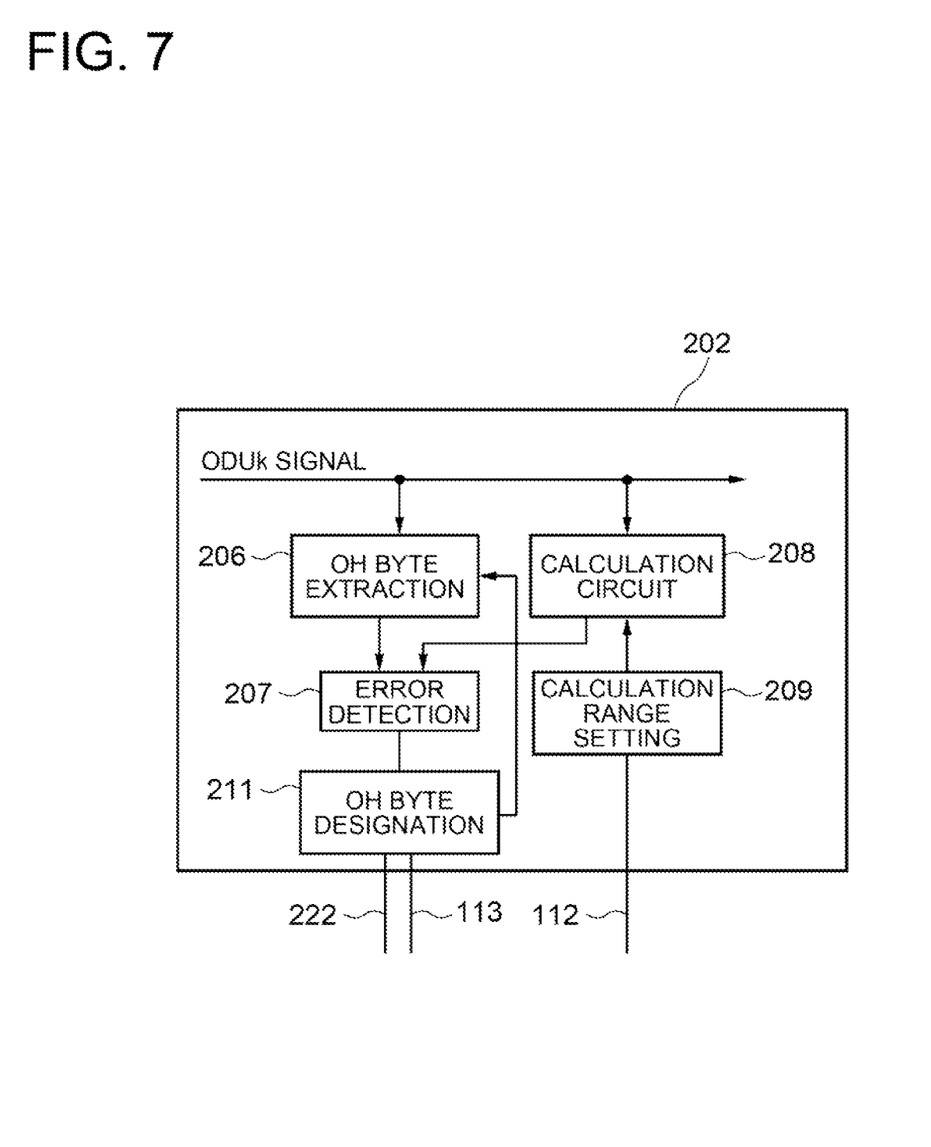
FIG. 7 is a block diagram of a BIP-8 function portion on the receiving side provided in another transmission device constituting the transmission system in accordance with the second exemplary embodiment of the present invention.

Referring to FIG. 7, the BIP-8 function portion on the receiving side 202 is composed of an OH byte extraction portion 206, an error detection portion 207, a calculation circuit 208, a calculation range setting portion 209, and an OH byte designation portion 211. The error detection portion 207, the calculation circuit 208, and the calculation range setting portion 209 are the same as the error detection portion 107, the calculation circuit 108, and the calculation range setting portion 109 of the BIP-8 function portion on the receiving side 102.

The OH byte designation portion 211 designates the byte of the OTU/ODU overhead to extract BIP-8 for the OH byte extraction portion 206. In particular, the OH byte designation portion 211 designates any unutilized overhead byte such as undefined bytes of RES, bytes of EXP, bytes for which the standard utilization method of FTFL has not yet specified, and the like. To designate which byte is determined by the information bestowed from the management device 133 through an interface 222.

The OH byte extraction portion 206 has a function for extracting BIP-8 from the byte on the OTU/ODU overhead designated by the OH byte designation portion 211.

According to the second exemplary embodiment, by making use of unutilized overhead byte such as undefined bytes of RES, bytes of EXP, bytes for which the standard utilization method of FTFL has not yet specified, and the like, it is possible to detect transmission error of OTU/ODU overhead by BIP-8.

A Third Exemplary Embodiment

Figure 8:
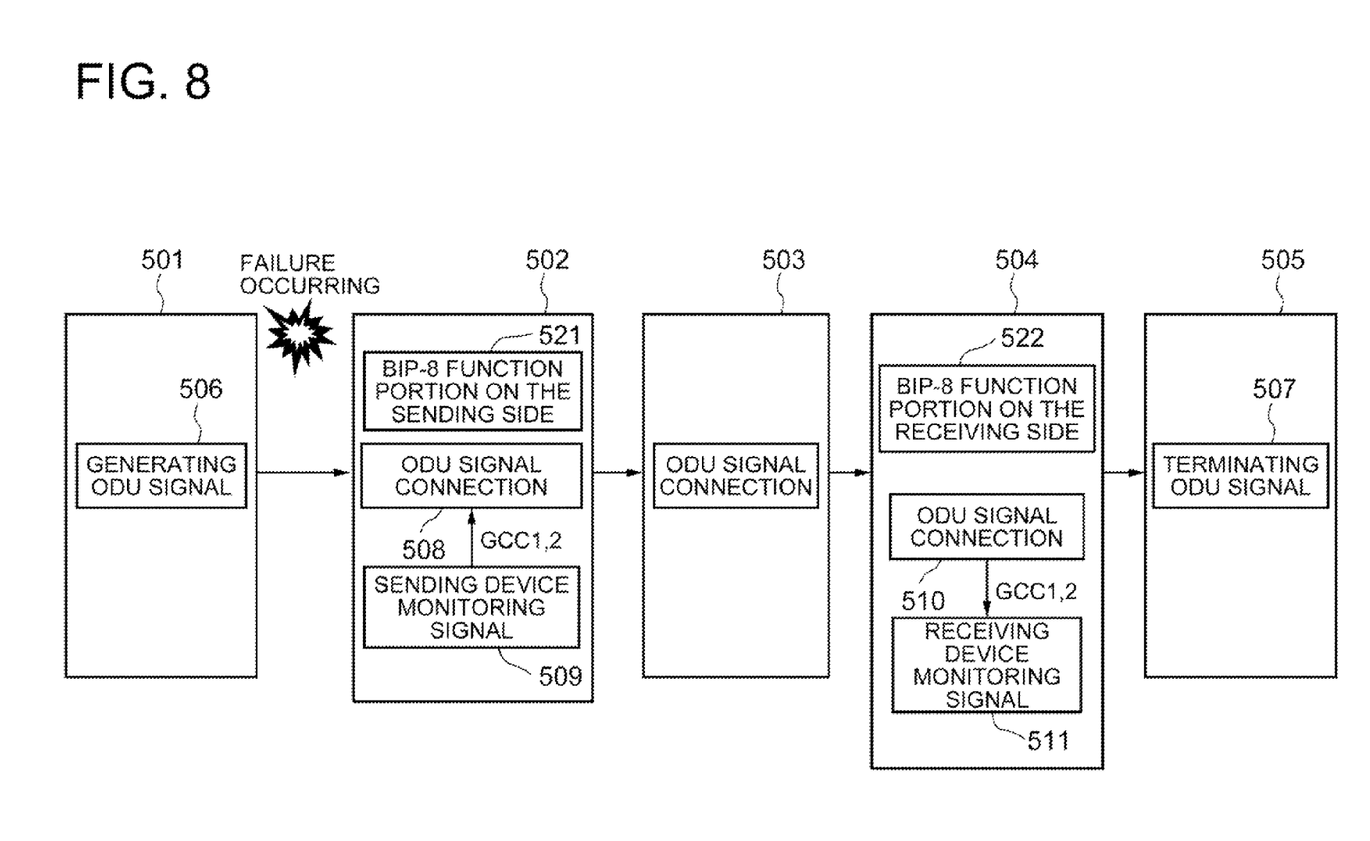
FIG. 8 is a block diagram of a transmission system in accordance with a third exemplary embodiment of the present invention.

Referring to FIG. 8, a transmission system in accordance with a third exemplary embodiment is composed of a transmission device 501 having a function 506 for generating ODU signals, transmission devices 502 to 504 having functions 508 and 510 for cross-connecting ODU signals, and a transmission device 505 having a function 507 for terminating ODU signals. That is, the transmission system of the third exemplary embodiment relays the ODU signals generated by the transmission device 501 with the transmission devices 502 to 504, and terminates the same with the transmission device 505.

Further, the transmission device 502 has a function 509 for inserting a data for device management into a relaying ODU signal on the way. Further, the transmission device 504 has a function 511 for extracting the data for device management inserted into the relaying ODU signal. In particular, the transmission device 502 inserts the data for device management into a predetermined byte of GCC1 and GCC2 of ODU overhead. Further, the transmission device 504 extracts the data for device management from the above predetermined byte of GCC1 and GCC2 of ODU overhead.

Further, a BIP-8 function portion on the sending side 521 is provided in the transmission device 502, and a BIP-8 function portion on the receiving side 522 is provided in the transmission device 504. The BIP-8 function portion on the sending side 521 is the same as the BIP-8 function portion on the sending side 101 in the first exemplary embodiment or the BIP-8 function portion on the sending side 201 in the second exemplary embodiment. The BIP-8 function portion on the receiving side 522 is the same as the BIP-8 function portion on the receiving side 102 in the first exemplary embodiment or the BIP-8 function portion on the receiving side 202 in the second exemplary embodiment.

Then, the above predetermined byte of GCC1 and GCC2 of ODU overhead is set as the calculation range into the BIP-8 function portion on the sending side 521 and the BIP-8 function portion on the receiving side 522.

According to the above configuration, when transmission error has occurred during the period of transmitting the data for device management mapped on the above predetermined byte of GCC1 and GCC2 of ODU overhead from the transmission device 502 to the transmission device 504, it is possible to detect the transmission error by BIP-8 independently of the transmission error occurring in payload. Therefore, as shown in FIG. 8, for example, even if a transmission failure has occurred between the transmission device 501 and the transmission device 502, it is still possible to detect by BIP-8 whether or not there is transmission error of the data for device management independently of that transmission failure.

A Fourth Exemplary Embodiment

Figure 9:
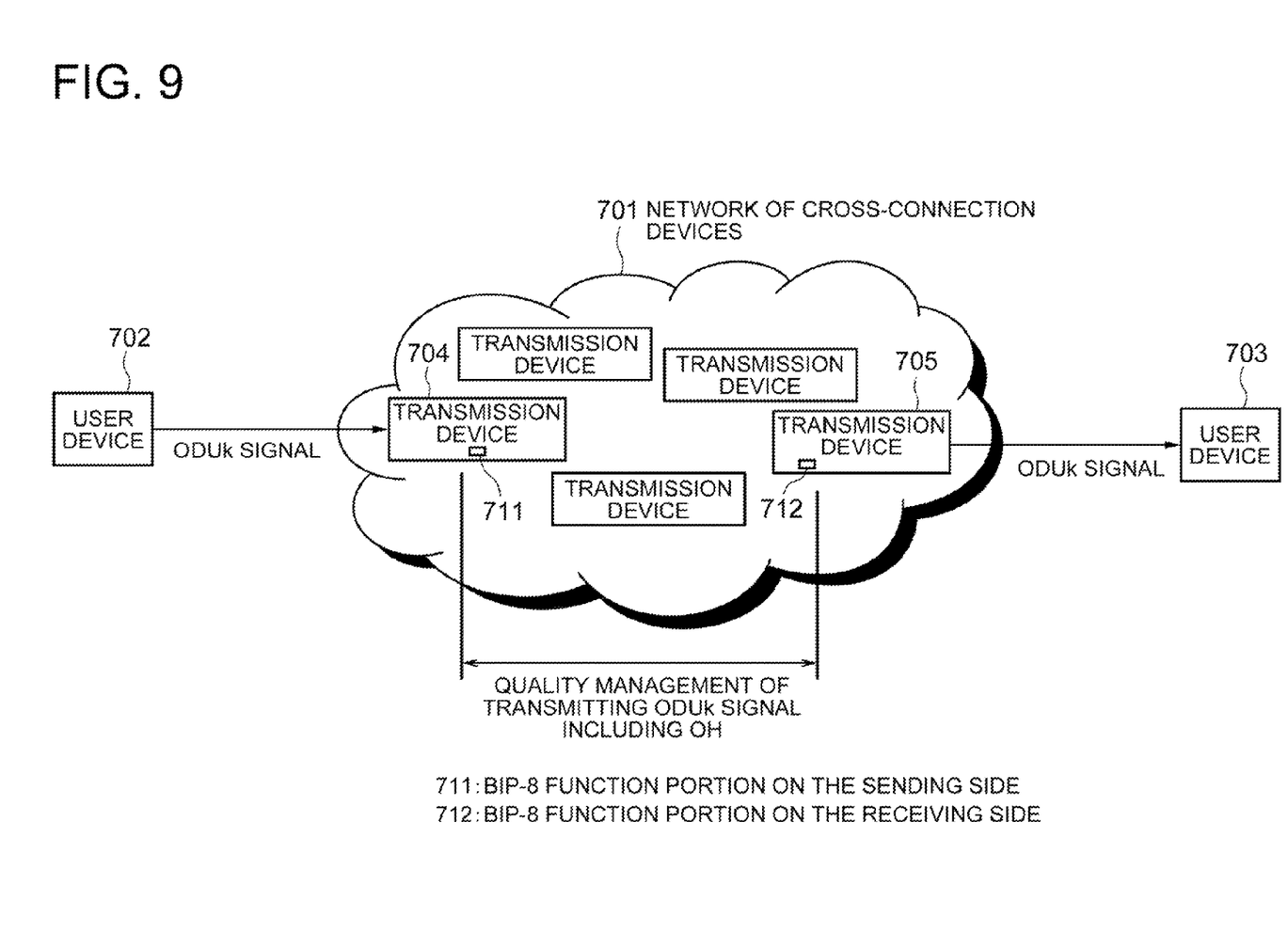
FIG. 9 is a block diagram of a transmission system in accordance with a fourth exemplary embodiment of the present invention.

Referring to FIG. 9, a transmission system in accordance with a fourth exemplary embodiment is composed of a user device 702, another user device 703, and a network 701 composed of transmission devices 704 and 705, and the like having a cross-connection function. This transmission system provides a service of transmitting ODU signals from the user device 702 to the user device 703 via the network 701 of ODU cross-connection devices. Then, the user device 702 maps user's original data not only onto the payload information of ODU signal but also onto a predetermined byte of ODU overhead (for example, the byte of GCC1 and GCC2) for the transmission.

Further, the transmission system in accordance with the fourth exemplary embodiment monitors the transmission quality by BIP-8 with respect to the payload information and the above predetermined byte of ODU overhead between the user device 702 and the transmission device 704 which is a connection point with the network 701, and between the user device 703 and the transmission device 705 which is another connection point with the network 701. In particular, a BIP-8 function portion on the sending side 711 is provided in the transmission device 704, while a BIP-8 function portion on the receiving side 712 is provided in the transmission device 705. The BIP-8 function portion on the sending side 711 is the same as the BIP-8 function portion on the sending side 101 in the first exemplary embodiment or the BIP-8 function portion on the sending side 201 in the second exemplary embodiment. The BIP-8 function portion on the receiving side 712 is the same as the BIP-8 function portion on the receiving side 102 in the first exemplary embodiment or the BIP-8 function portion on the receiving side 202 in the second exemplary embodiment.

Then, the above predetermined byte of ODU overhead and the payload information are set as the calculation range into the BIP-8 function portion on the sending side 711 and the BIP-8 function portion on the receiving side 712.

By virtue of the above configuration, it is possible to carry out quality management for the transmission between the transmission device 704 and the transmission device 705 by BIP-8 of the ODU signal including ODU overhead.

The invention claimed is:

1. A transmission system including a plurality of transmission devices carrying out sending and receiving of OPTICAL CHANNEL TRANSPORT UNIT frames, the transmission system comprising:
a first transmission device carrying out the sending of an OPTICAL CHANNEL TRANSPORT UNIT frame; and
a second transmission device carrying out the receiving of the OPTICAL CHANNEL TRANSPORT UNIT frame sent from the first transmission device,
wherein the first transmission device includes a first storage portion for storing first calculation range information indicating either one of a first area including OPTICAL-CHANNEL PAYLOAD UNIT only and a second area at least including an arbitrary byte of OPTICAL CHANNEL TRANSPORT UNIT/OPTICAL DATA UNIT overhead as an area for calculating a bit interleaved parity of 8 bits, a first calculation portion for calculating the bit interleaved parity of 8 bits for an area determined by the first calculation range information among areas of the sending OPTICAL CHANNEL TRANSPORT UNIT frame, and an insertion portion for inserting a calculation result of the bit interleaved parity of 8 bits from the first calculation portion into the sending OPTICAL CHANNEL TRANSPORT UNIT frame; and
wherein the second transmission device includes an extraction portion for extracting the bit interleaved parity of 8 bits from the received OPTICAL CHANNEL TRANSPORT UNIT frame, a second storage portion for storing second calculation range information indicating the same calculation range as the first calculation range information as an area for calculating a bit interleaved parity of 8 bits, a second calculation portion for calculating the bit interleaved parity of 8 bits for an area determined by the second calculation range information among areas of the received OPTICAL CHANNEL TRANSPORT UNIT frame, and an error detection portion for detecting error by comparing a calculation result of the bit interleaved parity of 8 bits from the second calculation portion with the bit interleaved parity of 8 bits extracted by the extraction portion.

2. The transmission system according to claim 1 further comprising a management device which includes: an input portion for inputting a group of a monitoring section and calculation range information corresponding to the monitoring section when the monitoring section is defined to be the section between the first transmission device which is the generation point of a bit interleaved parity of 8 bits and the second transmission device which is the examination point for examining the bit interleaved parity of 8 bits generated by the first transmission device, among the plurality of transmission devices through which the OPTICAL CHANNEL TRANSPORT UNIT frame passes; and a setting portion for setting the calculation range information to the relevant transmission device according to the information of the group inputted from the input portion.

3. The transmission system according to claim 1 further comprising a management device which includes: an input portion for inputting a group of a monitoring section and calculation range information corresponding to the monitoring section when the monitoring section is defined to be the section between the first transmission device which is the generation point of a bit interleaved parity of 8 bits and the second transmission device which is the examination point for examining the bit interleaved parity of 8 bits generated by the first transmission device, among the plurality of transmission devices through which the OPTICAL CHANNEL TRANSPORT UNIT frame passes; a storage portion for storing the group of a monitoring section and calculation range information corresponding to the monitoring section which is already set to the plurality of transmission devices; an examination portion for examining whether or not overlapping is brought on the monitoring section and the calculation range of OPTICAL CHANNEL TRANSPORT UNIT/OPTICAL DATA UNIT overhead by comparing the inputted group with the group in which the calculation range information is a calculation range at least including an arbitrary byte of OPTICAL CHANNEL TRANSPORT UNIT/OPTICAL DATA UNIT overhead among the groups stored in the storage portion, when the calculation range information of the group inputted from the input portion indicates a calculation range at least including an arbitrary byte of OPTICAL CHANNEL TRANSPORT UNIT/OPTICAL DATA UNIT overhead; and a setting portion for setting the calculation range information to the transmission device relevant to that group under the condition that no overlapping on the monitoring section and the calculation range of OPTICAL CHANNEL TRANSPORT UNIT/OPTICAL DATA UNIT overhead is confirmed by the examination portion, when the calculation range information of the group inputted from the input portion indicates a calculation range at least including an arbitrary byte of OPTICAL CHANNEL TRANSPORT UNIT/OPTICAL DATA UNIT overhead.

4. The transmission system according to claim 1, wherein the first transmission device further includes a first designation portion for designating an insertion place for the calculation result of the bit interleaved parity of 8 bits; and the insertion portion inserts the calculation result of the bit interleaved parity of 8 bits into the insertion place designated by the first designation portion.

5. The transmission system according to claim 1, wherein the second transmission device further includes a second designation portion for designating an insertion place for the calculation result of the bit interleaved parity of 8 bits; and the extraction portion extracts the bit interleaved parity of 8 bits from the insertion place designated by the second designation portion.

6. The transmission system according to claim 1, wherein the insertion portion inserts the calculation result into the second succeeding OPTICAL CHANNEL TRANSPORT UNIT frame after the OPTICAL CHANNEL TRANSPORT UNIT frame for which the first calculation portion has calculated the bit interleaved parity of 8 bits, and the error detection portion detects error by comparing the calculation result of the bit interleaved parity of 8 bits from the second calculation portion with the bit interleaved parity of 8 bits extracted by the extraction portion from the second succeeding OPTICAL CHANNEL TRANSPORT UNIT frame after the OPTICAL CHANNEL TRANSPORT UNIT frame for which the calculation result has been obtained.

7. A failure monitoring method to be performed by a transmission system composed of a plurality of transmission devices comprising: a first transmission device which has a first storage portion for storing first calculation range information indicating either one of a first area including OPTICAL-CHANNEL PAYLOAD UNIT only and a second area at least including an arbitrary byte of OPTICAL CHANNEL TRANSPORT UNIT/OPTICAL DATA UNIT overhead as an area for calculating a bit interleaved parity of 8 bits, a first calculation portion, and an insertion portion; and a second transmission device which has a second storage portion for storing second calculation range information indicating the same calculation range as the first calculation range information as an area for calculating a bit interleaved parity of 8 bits, an extraction portion, a second calculation portion, and an error detection portion, the failure monitoring method comprising:

calculating the bit interleaved parity of 8 bits for an area determined by the first calculation range information among areas of the sending OPTICAL CHANNEL TRANSPORT UNIT frame by virtue of the first calculation portion of the first transmission device;

inserting the calculation result of the bit interleaved parity of 8 bits from the first calculation portion into the second succeeding OPTICAL CHANNEL TRANSPORT UNIT frame and sending the same by virtue of the insertion portion of the first transmission device;

extracting the bit interleaved parity of 8 bits from the received OPTICAL CHANNEL TRANSPORT UNIT frame by virtue of the extraction portion of the second transmission device;

calculating the bit interleaved parity of 8 bits for an area determined by the second calculation range information among areas of the received OPTICAL CHANNEL TRANSPORT UNIT frame by virtue of the second calculation portion of the second transmission device; and detecting error by comparing the calculation result of the bit interleaved parity of 8 bits from the second calculation portion with the bit interleaved parity of 8 bits extracted by the extraction portion from the second succeeding OPTICAL CHANNEL TRANSPORT UNIT frame after the OPTICAL CHANNEL TRANSPORT UNIT frame for which the calculation result has been obtained by virtue of the error detection portion of the second transmission device.

8. The failure monitoring method according to claim 7, wherein the transmission system further comprises a management device which has an input portion, an examination portion, and a setting portion, and the failure monitoring method further comprises: inputting a group of a monitoring section and calculation range information corresponding to the monitoring section when the monitoring section is defined to be the section between the first transmission device which is the generation point of a bit interleaved parity of 8 bits and the second transmission device which is the examination point for examining the bit interleaved parity of 8 bits generated by the first transmission device, among the plurality of transmission devices through which the OPTICAL CHANNEL TRANSPORT UNIT frame passes, by virtue of the input portion of the management device; examining whether or not overlapping is brought on the monitoring section and the calculation range of OPTICAL CHANNEL TRANSPORT UNIT/OPTICAL DATA UNIT overhead between the monitoring sections with the second area at least including an arbitrary byte of OPTICAL CHANNEL TRANSPORT UNIT/OPTICAL DATA UNIT overhead as the calculation range among the monitoring sections already set to any of the transmission devices and the anticipated monitoring sections to be set hereafter to any of the transmission devices, by virtue of the examination portion of the management device; and setting the calculation range information to the transmission device relevant to a group under the condition that no overlapping on the monitoring section already set to the transmission device and the calculation range of OPTICAL CHANNEL TRANSPORT UNIT/OPTICAL DATA UNIT overhead is confirmed by the examination portion, with respect to the group with the second area at least including an arbitrary byte of OPTICAL CHANNEL TRANSPORT UNIT/OPTICAL DATA UNIT overhead as the calculation range among groups of the monitoring section inputted from the input portion and the calculation range information corresponding to that monitoring section, by virtue of the setting portion of the management device.

9. A transmission device carrying out sending and receiving of OPTICAL CHANNEL TRANSPORT UNIT frames, the transmission device comprising:

a sending portion; and
a receiving portion,
wherein the sending portion includes a first storage portion for storing first calculation range information indicating either one of a first area including OPTICAL-CHANNEL PAYLOAD UNIT only and a second area at least including an arbitrary byte of OPTICAL CHANNEL TRANSPORT UNIT/OPTIC DATA UNIT overhead as an area for calculating a bit interleaved parity of 8 bits, a first calculation portion for calculating the bit interleaved parity of 8 bits for an area determined by the first calculation range information among areas of a sending OPTICAL CHANNEL TRANSPORT UNIT frame, and an insertion portion for inserting a calculation result of the bit interleaved parity of 8 bits from the first calculation portion into the sending OPTICAL CHANNEL TRANSPORT UNIT frame; and wherein the receiving portion includes an extraction portion for extracting the bit interleaved parity of 8 bits from the received OPTICAL CHANNEL TRANSPORT UNIT frame, a second storage portion for storing second calculation range information indicating either one of a first area including OPTICAL-CHANNEL PAYLOAD UNIT only and a second area at least including an arbitrary byte of OPTICAL CHANNEL TRANSPORT UNIT/OPTICAL DATA UNIT overhead as an area for calculating a bit interleaved parity of 8 bits, a second calculation portion for calculating the bit interleaved parity of 8 bits for an area determined by the second calculation range information among areas of the received OPTICAL CHANNEL TRANSPORT UNIT frame, and an error detection portion for detecting error by comparing a calculation result of the bit interleaved parity of 8 bits from the second calculation portion with the bit interleaved parity of 8 bits extracted by the extraction portion.

* * * * *